(12) United States Patent
Winkler

(10) Patent No.: US 7,097,045 B2
(45) Date of Patent: Aug. 29, 2006

(54) AUTOMATED SYSTEM AND METHOD OF STORING AND PICKING ARTICLES

(75) Inventor: Walter Winkler, Parkstein (DE)

(73) Assignee: Witron Logistik & Informatik GmbH, Parkstein (DE)

( * ) Notice: Subject to any disclaimer, the term of this patent is extended or adjusted under 35 U.S.C. 154(b) by 218 days.

(21) Appl. No.: 10/600,412

(22) Filed: Jun. 20, 2003

(65) Prior Publication Data

US 2004/0193311 A1 Sep. 30, 2004

(30) Foreign Application Priority Data

Mar. 26, 2003 (DE) ................................ 103 13 577

(51) Int. Cl.
*B65G 65/23* (2006.01)

(52) U.S. Cl. .................................. 209/630; 414/416.11

(58) Field of Classification Search ................ 209/630, 209/583, 912; 198/347.1, 348, 358; 414/415, 414/416.09, 419, 421, 416.11

See application file for complete search history.

(56) References Cited

U.S. PATENT DOCUMENTS

| | | | | |
|---|---|---|---|---|
| 3,027,023 A | * | 3/1962 | McGrath ..................... | 414/276 |
| 3,526,327 A | * | 9/1970 | Atwater ....................... | 414/282 |
| 3,661,280 A | * | 5/1972 | Atwater ....................... | 414/282 |
| 3,944,093 A | * | 3/1976 | Bergeron ............... | 414/331.05 |
| 4,678,390 A | * | 7/1987 | Bonneton et al. .......... | 414/282 |
| 4,850,783 A | | 7/1989 | Maekawa ................ | 414/792.9 |
| 4,869,801 A | * | 9/1989 | Helms et al. ......... | 204/298.15 |
| 4,909,697 A | * | 3/1990 | Bernard et al. ........ | 414/331.04 |
| 4,932,828 A | * | 6/1990 | Katae et al. ................ | 414/286 |
| 5,472,309 A | * | 12/1995 | Bernard et al. ............. | 414/807 |
| 5,690,463 A | * | 11/1997 | Yoshie ....................... | 414/266 |
| 5,733,098 A | | 3/1998 | Lyon et al. ................. | 414/786 |
| 6,139,243 A | * | 10/2000 | Jackson et al. ............. | 414/405 |
| 6,450,751 B1 | | 9/2002 | Hollander .................... | 414/268 |
| 2005/0047895 A1 | * | 3/2005 | Lert, Jr. ...................... | 414/273 |

FOREIGN PATENT DOCUMENTS

| | | |
|---|---|---|
| CH | 435116 A | 10/1967 |
| DE | 3803411 A1 | 10/1970 |
| DE | 4213351 A1 | 10/1993 |
| DE | 19947167 A1 | 4/2001 |
| DE | 10013092 A1 | 9/2001 |
| EP | 1211198 A | 6/2002 |
| GB | 2265893 A | 10/1993 |

OTHER PUBLICATIONS

Office Action from German Patent and Trademark Office dated Mar. 1, 2004 for German Application S/N 103 13 577.4, filed Mar. 26, 2003.
English translation of Office Action from German Patent and Trademark Office dated Mar. 1, 2004 for German Application S/N 103 13 577.4, filed Mar. 26, 2003.
European Search Report dated Jul. 8, 2004 corresponding to 04006840.5 -2308.

* cited by examiner

*Primary Examiner*—Joseph Rodriguez
(74) *Attorney, Agent, or Firm*—DLA Piper Rednick Gray Cary US LLP

(57) ABSTRACT

An automated storage system for storing and picking articles delivered on incoming load carriers such as pallets comprises a device (depalletizer) for separating the article packing units, a tray storage facility (130) for storing the packing units (15) on trays (10), a take-off conveying system (42, 45, 135) for removing and feeding the packing units (15) in sequence for loading onto order load carriers, and a loading station (140) for loading the packing units (15) in a defined loading sequence onto order load carriers (20) for dispatch e.g. by lorry. The invention enables fully mechanized and automated storage and picking of the articles.

24 Claims, 13 Drawing Sheets

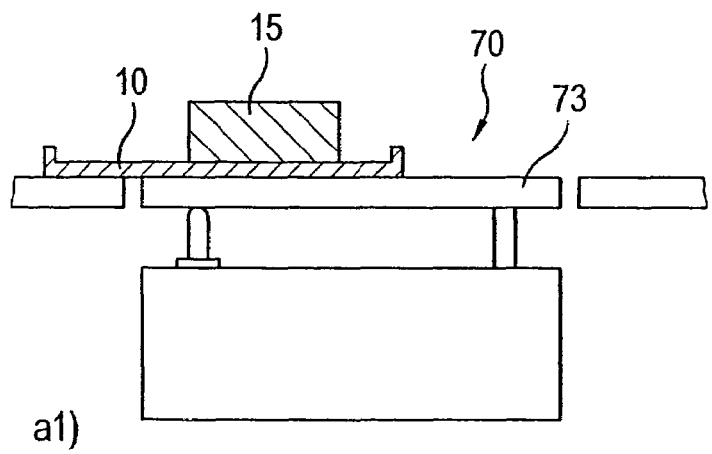
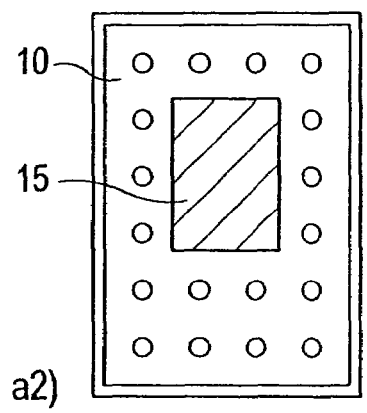
a1) a2)
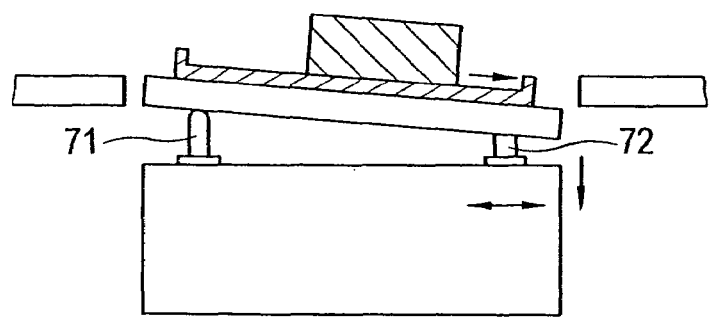
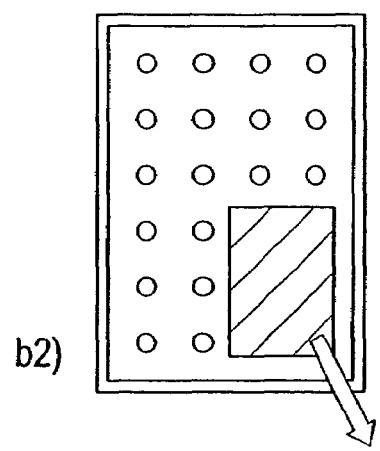
b1) b2)
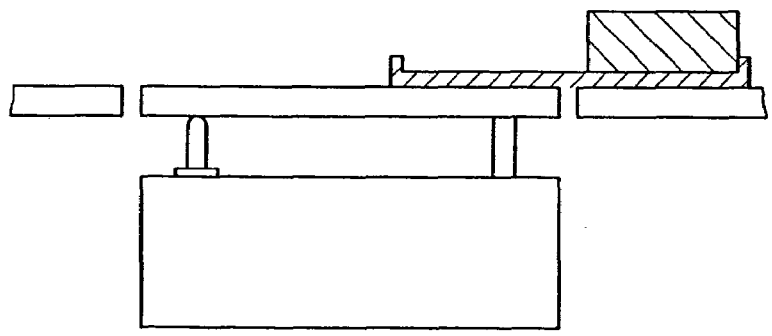
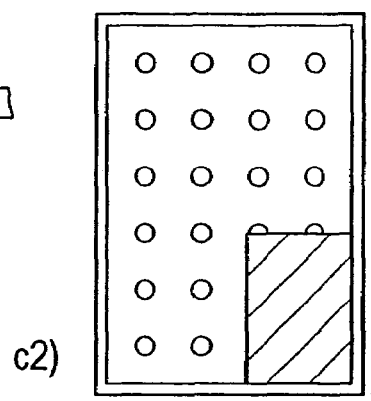
c1) c2)
FIG. 9

AUTOMATED SYSTEM AND METHOD OF STORING AND PICKING ARTICLES

FIELD OF THE INVENTION

The invention relates to a storage system and a storage method of storing and picking articles, which are delivered e.g. on incoming load carriers such as e.g. pallets and are dispatched in accordance with a pick order on order load carriers, which may likewise be pallets.

TECHNICAL BACKGROUND

In the development of logistics systems there is a trend towards an ever greater degree of automation in order to save costs and time and increase the profitability of the systems. It is therefore known to use automated, computer-controlled rack-mounted machines for storage into, and retrieval from, a high-rise installation, for example. In said case, an operation that is crucial to the efficiency of the overall system is the picking operation, i.e. collation of the goods for a delivery order, e.g. collation of a parts delivery from a supplier to a car manufacturer or of order pallets containing goods for the branches of a supermarket chain.

In prior art the picking operation even in, as a whole, highly automated storage systems is essentially still carried out manually by a picker, who either stands in an—electronically guided—rack-mounted storage/retrieval machine and removes the goods from the high-rise installation or "picks" the goods from a picking area of a fixed width (e.g. 8 to 14 m) or transfers the goods from a storage container to an order container. The manual work is costly, limits the profitability of the system as a whole and—especially in the case of heavy articles—entails health risks for the picker.

OBJECT OF THE INVENTION

The object of the present invention is therefore to propose an automated storage and picking system and an automated storage and picking method, which avoid the mentioned drawbacks of prior art and enable extensive mechanization and automation of the entire storage and picking operation from delivery to dispatch.

The object is achieved by a storage system for storing and picking articles, comprising a device for separating the delivered articles into packing units and transferring the latter onto trays, a tray storage facility for storing the packing units on trays, a take-off conveying system for removing and feeding the packing units in a defined sequence, and a loading station for loading the packing units onto order load carriers in a loading order determined by the defined sequence.

The storage system according to the invention allows automation also of the picking operation, thereby making it possible to dispense with pickers. It is therefore possible to automate the logistics system as a whole to an even greater extent and increase profitability.

In the tray storage facility a separate tray is preferably provided for each packing unit. According to a variant of the invention the trays have openings, through which lifting pins engage in order to lift a packing unit from the tray.

According to the invention the take-off conveying system is designed for removal of the packing units in a defined order. To said end, the take-off conveying system may have a sorting device and/or overtaking device. The take-off conveying system further comprises preferably computer-controlled rack-mounted take-off machines.

For different article sizes trays of different dimensions may be used, wherein preferably predefined standard dimensions are selected, which are easier for the conveying system to handle.

According to a variant the loading station has an automated loading apparatus for loading the packing units onto an order load carrier, with the result that the degree of automation of the overall system may be further increased. Advantageously, four retrieval paths from the tray storage facility are associated with each loading apparatus.

So that the trays and hence the packing units may be fed in a defined position to the loading apparatus, a tray-vibrating device for positioning a packing unit on the tray and a rotary apparatus for rotating the tray carrying the packing unit may be provided.

For loading laterally enclosed load carriers, such as boxes, containers or mesh boxes, a load-carrier tilting device may be provided, by means of which the enclosed load carrier is tilted e.g. through 90 degrees in a forward direction so that it may be loaded "from above" by the loading device according to the invention. In a corresponding manner a packing-unit tilting device is then preferably provided upstream of the loading apparatus for tilting the packing units through 90 degrees in accordance with the determined loading configuration.

The invention moreover proposes a rack storage facility for storing articles, which rack storage facility comprises storage racks for storing trays, which carry the articles to be stored and which each have openings for the removal of an article from the tray by lifting means, which engage through the openings.

The rack storage facility according to the invention therefore enables the removal of the stored articles from the trays by "lifting" them out from below, without any need for gripping arms or the like. Thus, damage of the articles on being downloaded from the tray may be avoided.

The invention further proposes a method of storing and picking articles in a storage facility, which method comprises the following steps: (a) separation of the articles into packing units, (b) transfer of the packing units onto trays, (c) storage of the packing units lying on the trays in a tray storage facility serving as a buffer, (d) logging of a pick order and of the packing units needed to fill the pick order, (e) retrieval of the packing units needed for the pick order from the tray storage facility, (f) sorting of the retrieved trays into a defined sequence, and (g) transfer of the packing units onto order load carriers in the loading order determined by the sequence for optimum loading with regard to volume and/or stability of the load stack.

The method according to the invention realizes unmanned picking of the articles needed for a pick order from the tray storage facility serving as a buffer. Thus, the efficiency and profitability of the logistics system may be increased and the logistics costs reduced.

According to the invention the packing units are retrieved in such a way from the tray storage facility that they are fed in a defined order to the device for loading them onto the order pallets. Thus, the method of loading the order load carriers may be optimized.

According to a variant the method moreover comprises the method step of wrapping the load stack formed on the order load carrier in protective means, e.g. a film, in order to stabilize the load stack.

Further forms of implementation of the invention arise from the further sub-claims.

BRIEF DESCRIPTION OF THE DRAWINGS

There now follows a description of concrete embodiments of the invention with reference to the accompanying drawings.

FIG. 9 diagrammatically illustrates the mode of operation of an embodiment of a tray-vibrating device according to the invention.

DETAILED DESCRIPTION OF EMBODIMENTS

Figure 1:
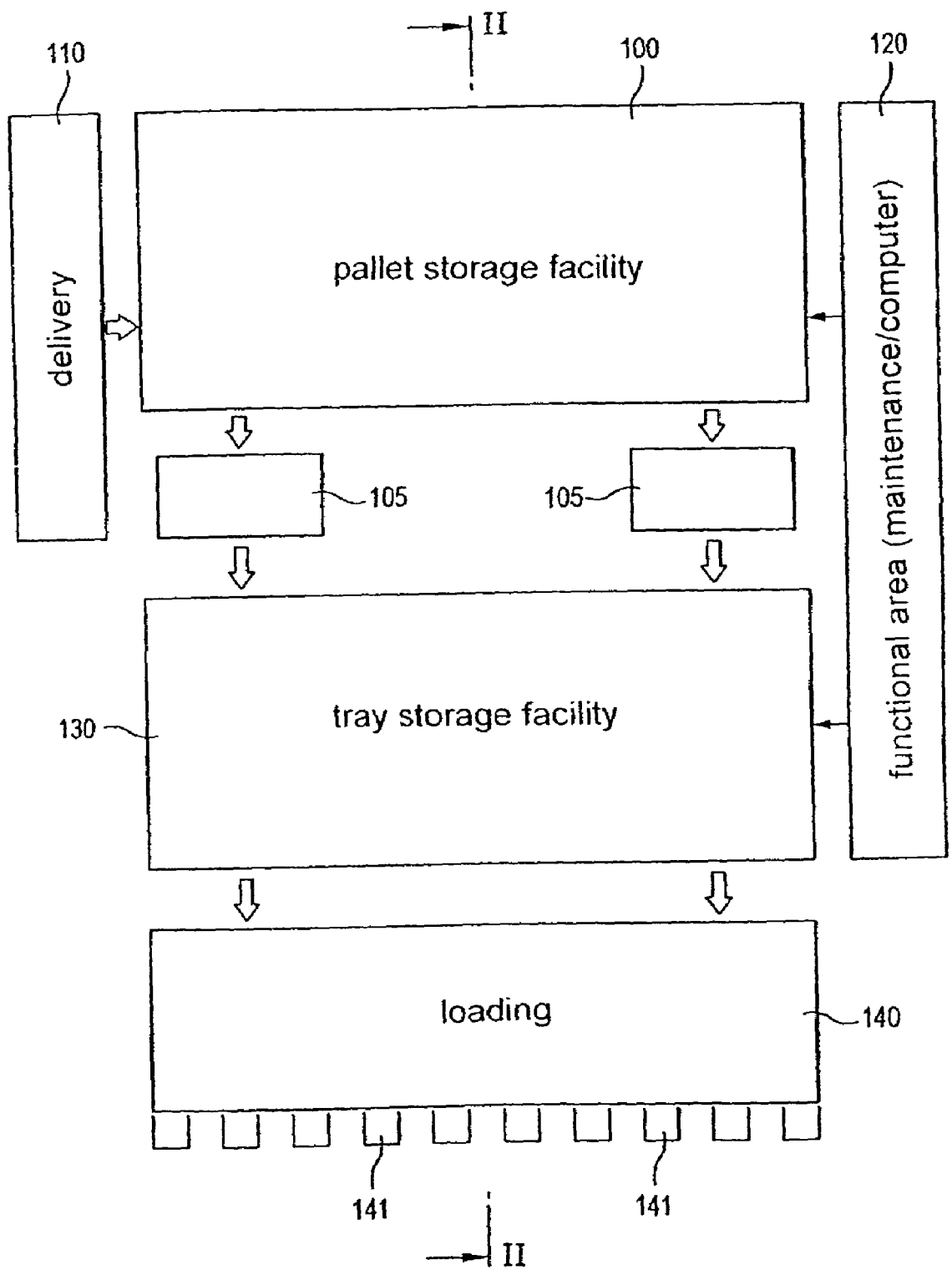
FIG. 1 is a diagrammatic plan view of a storage system according to an embodiment of the invention.
Figure 2:
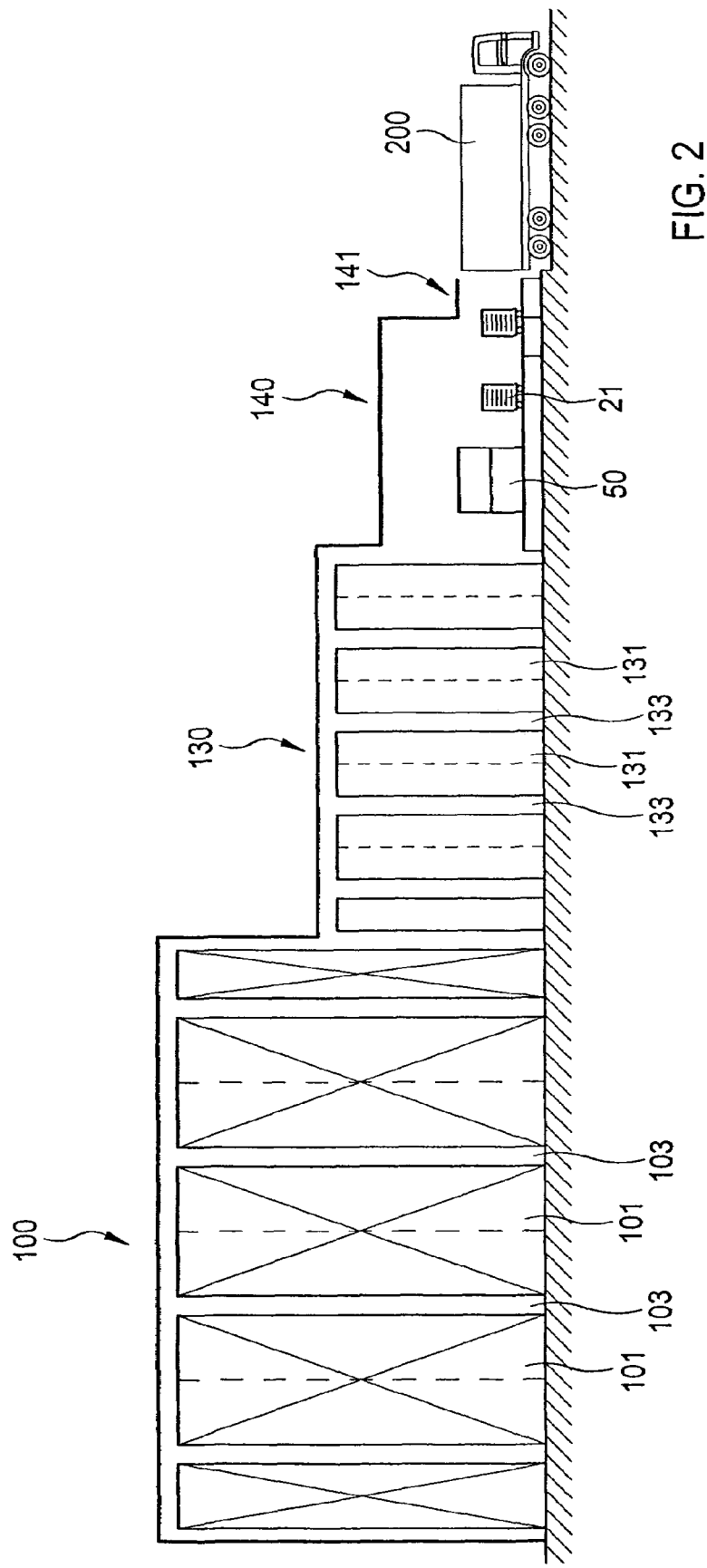
FIG. 2 is a cross-sectional view along the line II—II of FIG. 1.

FIG. 1 shows in plan view an embodiment of a storage apparatus according to the invention and FIG. 2 shows a cross-sectional view along the line II—II of FIG. 1.

The incoming storage facility 100 is designed e.g. as a pallet storage facility, i.e. the articles or goods delivered to a delivery station 110 are stored on the delivery pallets in the pallet storage facility or incoming storage facility 100 in rack rows 110. In a manner known per se rack-mounted storage/retrieval machines are movable in the aisles 103 formed between the rack rows 101 (see FIG. 2) and store the delivered storage pallets in the rack storage facility. Connected by an automated conveying system to the rack storage facility is a tray storage facility 130, which in turn comprises storage racks 131, which are separated by aisles 133 and in which the articles to be stored are stored on trays. According to the embodiment illustrated in FIG. 2 the tray storage facility 130 has a lower overall height than the pallet storage facility 100.

Figure 4:
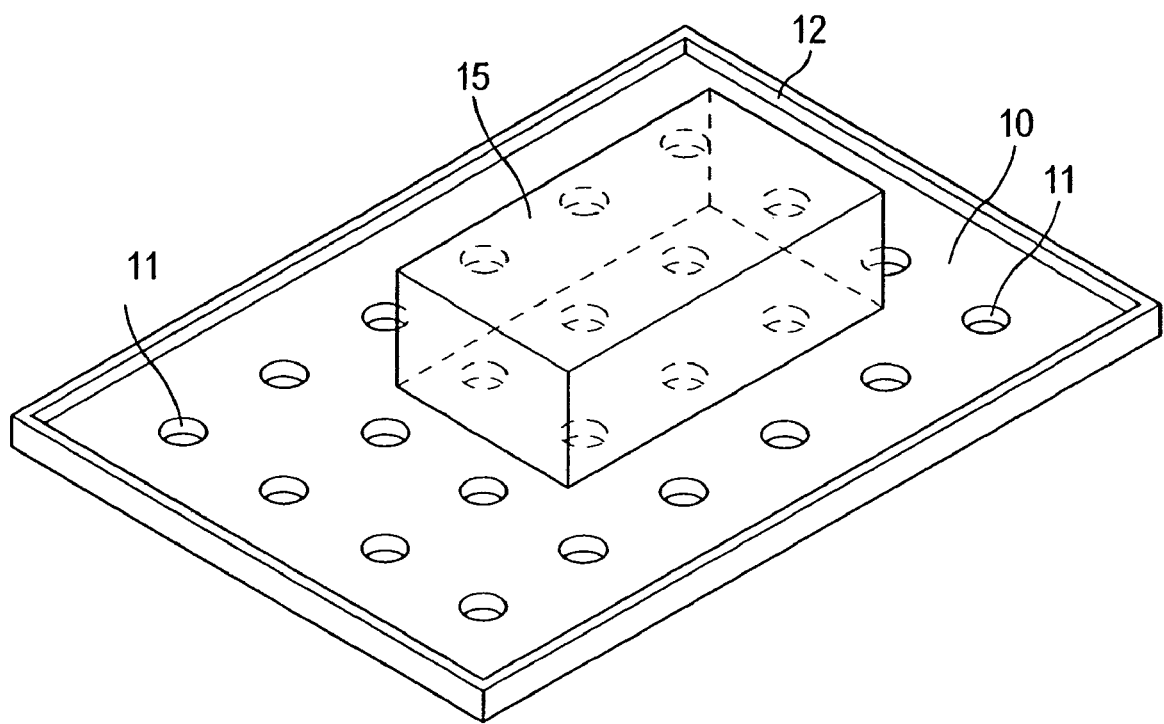
FIG. 4 is a diagrammatic perspective view of a tray with packing unit, which are usable with the invention.

FIG. 4 is a diagrammatic view of an embodiment of the trays 10 used in the tray storage facility 130 according to the invention. The trays are generally of a shallow, tablet-shaped design and preferably have a circumferential edge 12. The trays may have different dimensions depending on the articles 15 to be stored. In their base the trays 10 preferably have holes or openings 11, through which—as will be described in detail below—a lifting device for lifting an article stored on the tray may engage. Situated on each tray 10 there is preferably just one article 15, e.g. a packing unit (colli), for loading onto an order pallet of a lorry 200.

As is diagrammatically shown in FIG. 1, between pallet storage facility 100 and tray storage facility 130 a depalletizing device 105 is provided, which in a manner known per se by means of gripping and suction means automatically separates the incoming pallet stacks into the packing units forming the pallet stack. Adjoining the pallet storage facility and the tray storage facility is a functional area 120, which is used for maintenance and repair and may comprise e.g. a warehouse management computer. Adjoining the tray storage facility 130 is a loading zone 140, which has one or more loading apparatuses 50 according to the invention for load carriers, on which apparatuses load carriers such as e.g. order pallets are loaded with the packing units 15 required for a pick order. The load carriers with a complete load stack 21 are loaded via a lorry ramp 141 (see FIG. 2) at the same level into the lorry 200.

Figure 3:
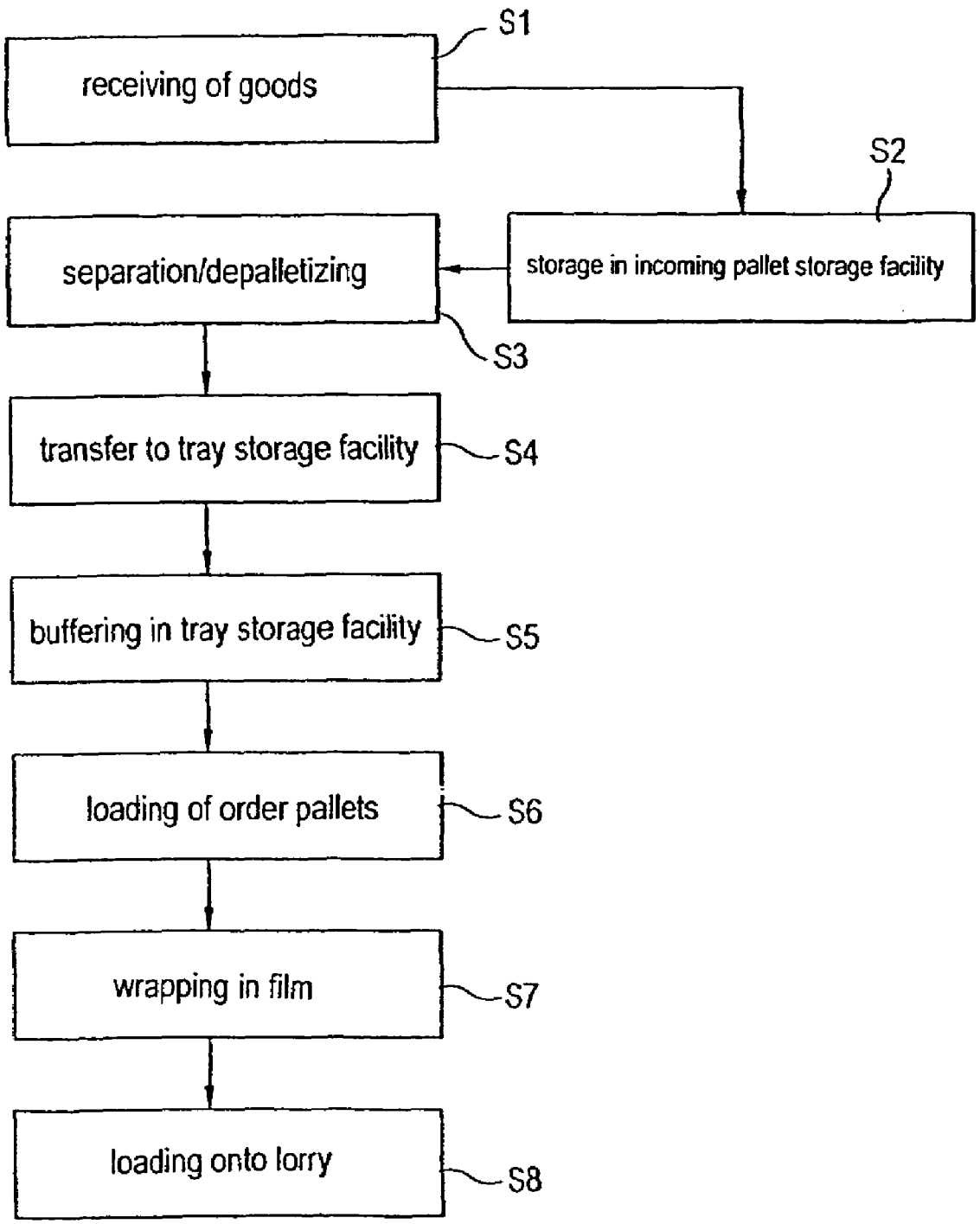
FIG. 3 diagrammatically illustrates central method steps of an embodiment of the method according to the invention.

An embodiment of the method according to the invention is illustrated diagrammatically in the flow chart of FIG. 3. In a first step S1 the goods are delivered, e.g. by lorry, to the delivery station 110 and are then stored by means of the preferably automated conveying system in the pallet storage facility 100 (step S2). The tray storage facility 130 adjoining the pallet storage facility serves as a buffer so that, whenever there is a scarcity of articles in the tray storage facility 130, e.g. there is stock only for a 24-hour or 48-hour period, the articles are requested from the pallet storage facility 100, removed from the pallets and in a step S3 separated by the depalletizing device 105, before being loaded individually onto the trays 10 (step S4). By means of a suitable conveying system (not shown) the articles on the size-adapted trays are provisionally stored or buffered in the tray storage facility 130. Preferably, smaller articles are stored four-deep on small trays or large articles are stored two-deep on larger trays in tray racks.

Figure 8:
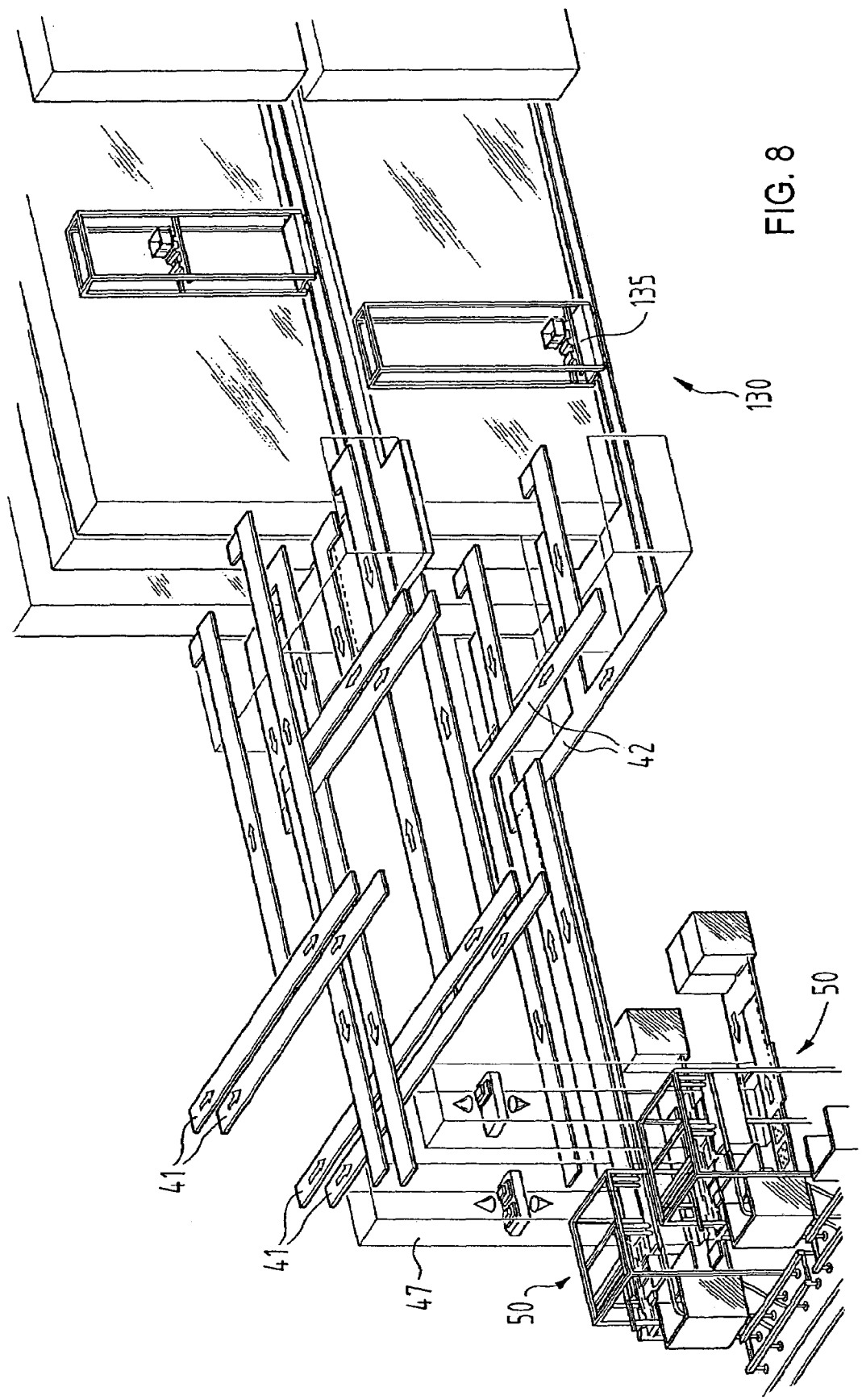
FIG. 8 is a diagrammatic view of an embodiment of a tray storage facility according to the invention with loading apparatus and associated conveying system.

As soon as one or more pick orders, i.e. orders to collate and load a delivery of goods, e.g. for a retail trade branch, are logged, the articles and/or packing units required for the pick order are removed from the tray storage facility by the automated conveying system (rack-mounted storage/retrieval machine 135, retrieval paths 42, see FIG. 8) and fed in a specific order (to be explained in detail below) to the loading zone 140. There, the packing units are loaded onto order pallets (step S6), film is wrapped around the load stacks (step S7) and the latter are finally loaded onto lorries (step S8).

Figure 5:
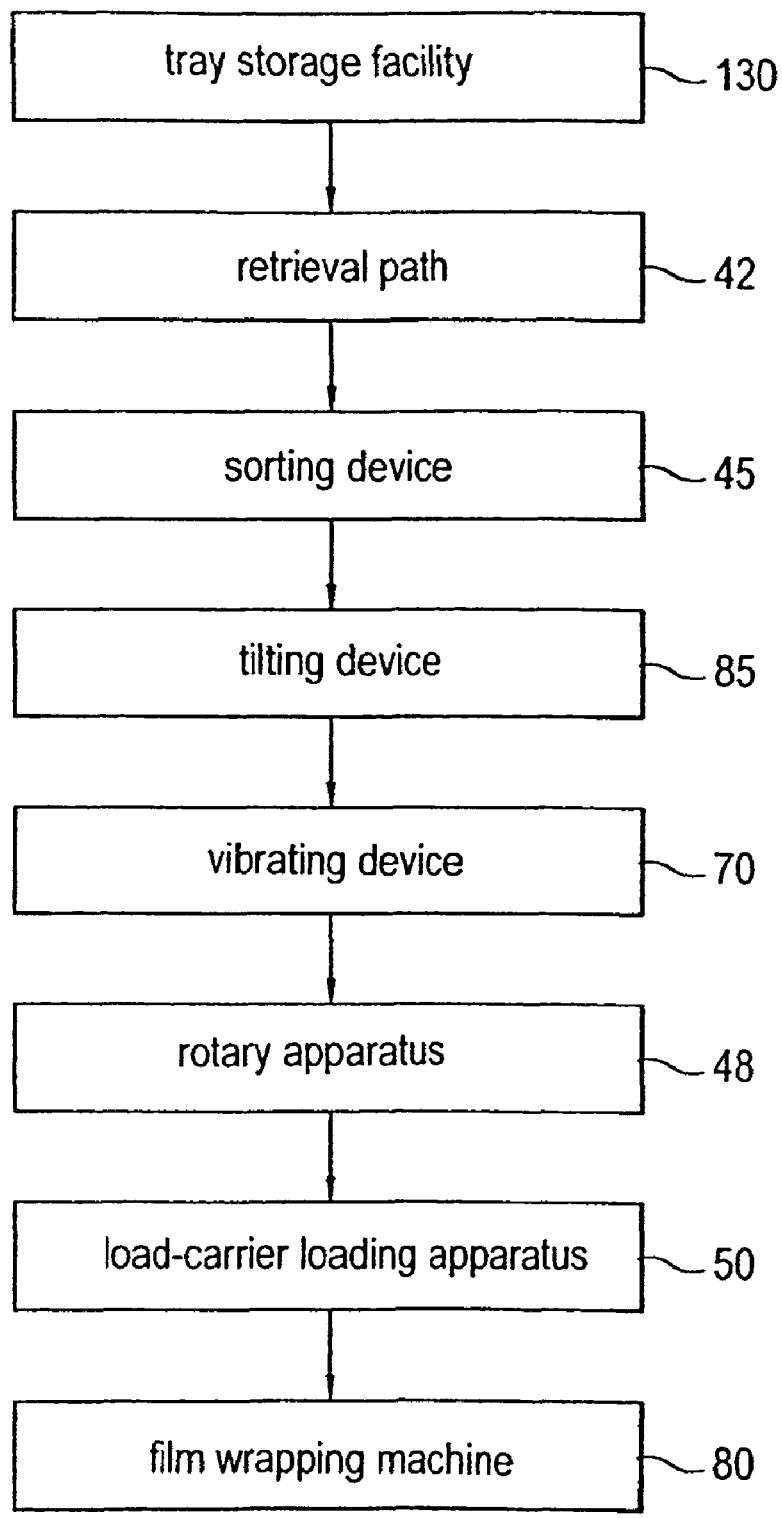
FIG. 5 diagrammatically illustrates the stations, through which a packing unit runs from the tray storage facility up to loading onto the lorry.

A diagram illustrating the individual stations, through which the individual packing units run from the tray storage facility up to loading onto the lorry, is shown in FIG. 5. The packing units are removed from the tray storage facility 130 by suitable rack-mounted storage/retrieval machines 135 (see FIG. 8) and transferred onto retrieval paths 42, which take the form of endless conveying devices. The retrieval paths preferably have one or more sorting devices 45, which may be designed as overtaking devices with a parallel track or passing track of the retrieval path 42, which track is provided with two sorting gates, and enable an overtaking operation or a change of the retrieval sequence of two or more trays removed from the tray storage facility.

A packing-unit tilting device 85 may then be provided for tilting a packing unit on the tray through 90 degrees. For said purpose, lifting pins for lifting the packing unit and/or suitable grippers may be used. A tray then moves onto a tray-vibrating device 70, the mode of operation of which is described in detail later with reference to FIG. 9, where the packing unit 15 may be positioned in a defined manner relative to the tray 10, e.g. in a corner of the tray. The tray plus packing unit then moves to a rotary apparatus 48, at which the tray may be rotated through 90°, 180° or 270° in order to assume a defined position relative to the downstream load-carrier loading apparatus 50. There, the packing units are loaded onto a load carrier and/or order pallet 20 and form a load stack 21, around which for the purpose of stabilization a film is wrapped by a film wrapping machine 80. The load stack thus produced on the pallet may then be loaded onto a lorry and transported to the place of delivery, e.g. a retail trade branch.

Figure 6:
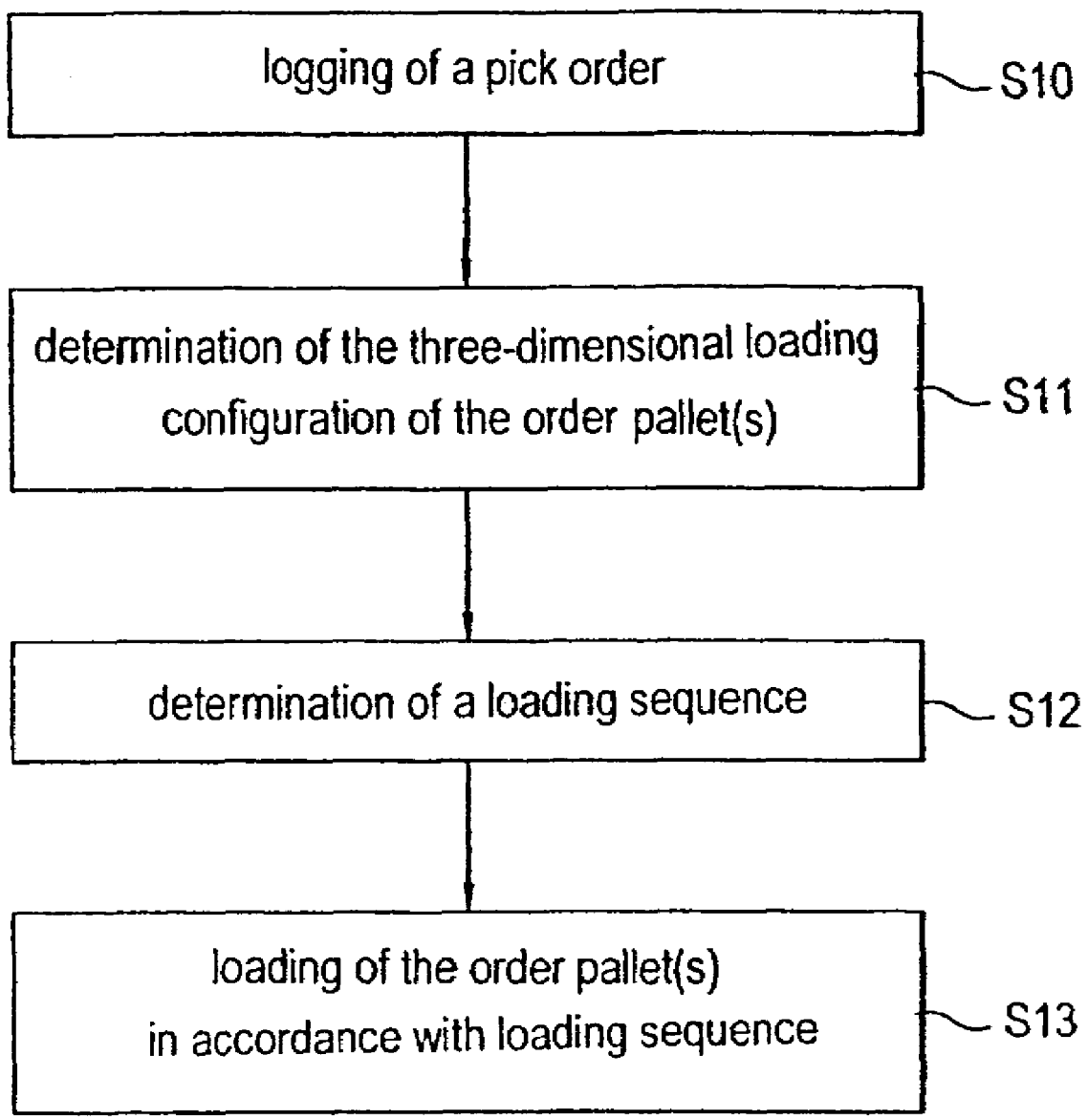
FIG. 6 diagrammatically illustrates in the form of a flow chart the method steps of an embodiment of a method of automatically loading a load carrier.

The diagram of FIG. 6 diagrammatically illustrates the steps of the method of automatically loading a load carrier with packing units forming a load stack. In the first step S10 a pick order, which may comprise one or more load carriers (pallets) 20, is logged by the warehouse management computer (not shown). On the basis of the articles being identified by identification codes and their pack sizes being stored in a memory, in a method step S11 a three-dimensional loading configuration of one or more load stacks on the order pallet(s) is determined. In so doing, a wide variety of aspects have to be considered. Firstly, the complete load stack has to be as stable as possible and easily transportable, i.e. heavy articles are preferably stored in the bottom part of the load stack and lighter articles preferably in the top part of the load stack. Equally, more delicate articles or packing units are better accommodated in the top part of the load stack. What is more, the load space of the delivery lorry should be optimally utilized, i.e. the load stack should be as densely packed and as high as possible. Furthermore, the loading configuration has to be such that with the automatic loading machine it is possible to load the load stack in a fixed loading sequence, which is determined in the next step S12. In the following method step S13 the at least one order pallet is loaded in accordance with the loading sequence with the packing units 15 in accordance with the previously determined three-dimensional loading configuration.

Figure 7:
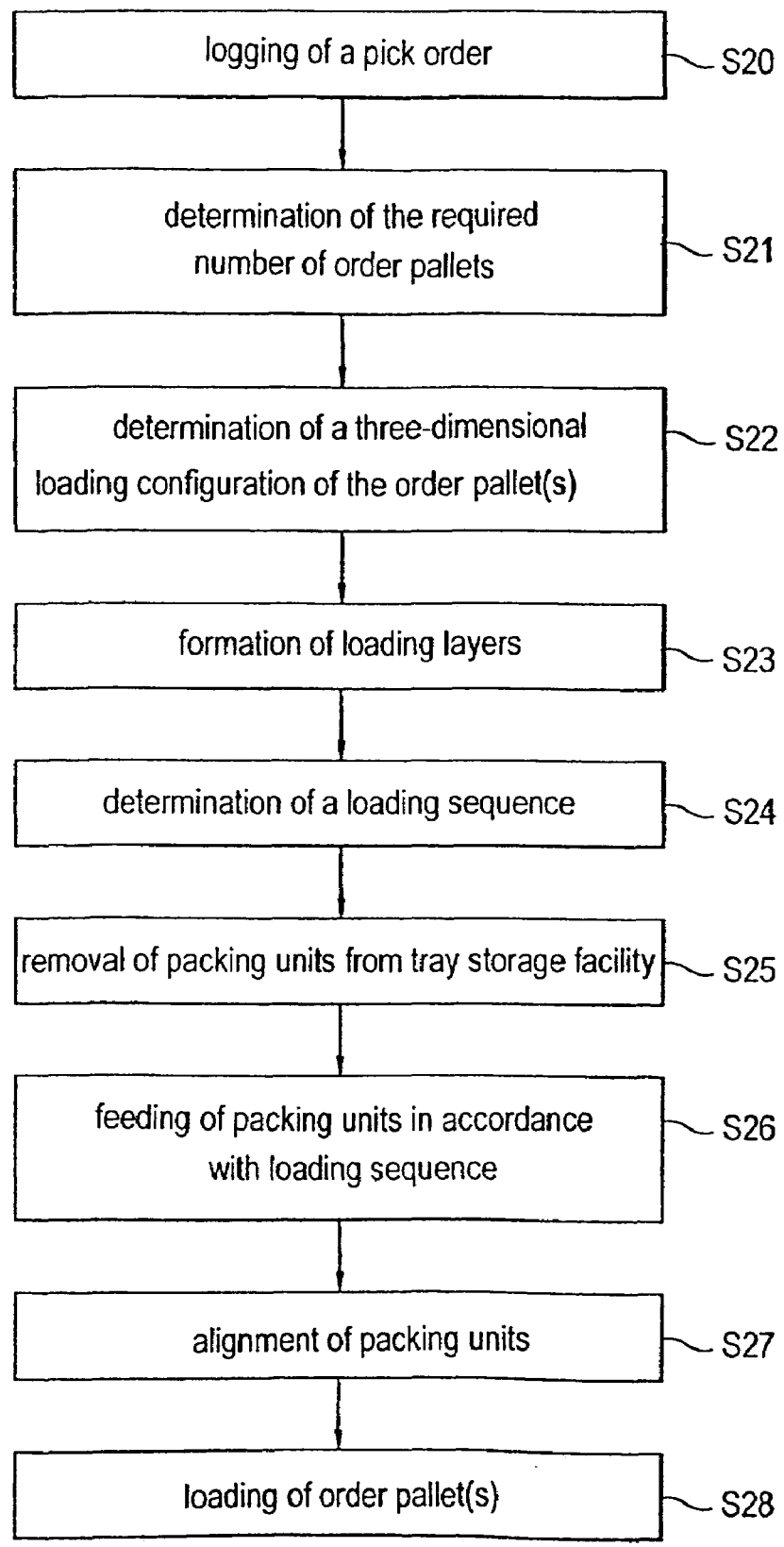
FIG. 7 diagrammatically illustrates in the form of a flow chart an embodiment of a picking method, which is usable with the present invention.

There now follows a detailed description of a further embodiment of a loading method with reference to the flow chart of FIG. 7.

In the method step S20 the packing units 15 forming a pick order are logged and in the next method step S21 the required number of order pallets is determined from the stored volume and/or stored weight of the logged packing units. Then, in the manner described above with reference to FIG. 6 a three-dimensional loading configuration of the load stack on the order pallet and/or load carrier 20 is determined, wherein various marginal conditions such as the stability of the load stack or optimum utilization of space are to be taken into account. In said case, it is advantageous to form individual loading layers (step S23), which comprise individual packing units each of a similar size or at least of a similar height.

In the next method step S24 the loading layers are used as a basis to determine a loading sequence or loading order, in which the load stack 21 derived in step S22 is built from the bottom up. In said case, on an order pallet each loading layer is built up from the back towards the front and from left to right or from right to left.

Once the loading configuration and loading sequence of the load stack have been determined by means of the warehouse management computer, the packing units lying on trays are removed from the buffer—and/or tray storage facility and fed to the loading machine 50. In said case, it would be possible for the individual packing units to be removed already in the correct order (loading sequence) from the tray storage facility or to be brought into the correct order by means of one or more sorting devices 45 (step S26). By means of a packing-unit tilting device 85 the packing units may be rotated through 90°, 180° etc., by suitable means such as e.g. pins or grippers and then replaced in the rotated position on the tray. Packing units are then aligned horizontally on the tray by means of a rotary apparatus 48 and a tray-vibrating device 70 and fed, optionally via a lift 47 (see FIG. 8), to the loading apparatus 50, where they are disposed in accordance with the loading sequence on the load carrier 20 at the load stack location determined by the spatial (three-dimensional) loading configuration.

The tray-vibrating device used to align an article or packing unit 15 on the tray 10 is now described with reference to FIG. 9. The tray-vibrating device 70 comprises a tilting support 71 and a lifting piston 72, which supports a support plate 73 at the corner lying diagonally opposite the tilting support 71, and by virtue of a downward movement of the lifting piston effects a diagonal tilting of the support plate 73 and hence of a tray 10 resting thereon.

The operation of aligning the packing unit 15 on the tray 10 is diagrammatically illustrated in FIG. 9 in the diagram sequence a1) to c1) in side view and in the diagram sequence a2) to c2) in plan view. In FIG. 9a, the tray 10 carrying the packing unit 15 passes from the conveying device onto the support plate 73 of the tray-vibrating device 70. In FIG. 9b, the lifting piston 72 is lowered with simultaneous horizontal vibrating motions (to overcome frictional forces) so that the packing unit 15 moves towards the lowered corner of the tray 10 (see arrow in FIG. 9b2), with the result that the packing unit 15 is aligned on the tray. The lifting piston is then raised again so that the support plate is situated in a horizontal position and the tray 10 with the aligned packing unit 15 may be conveyed further.

Figure 10:
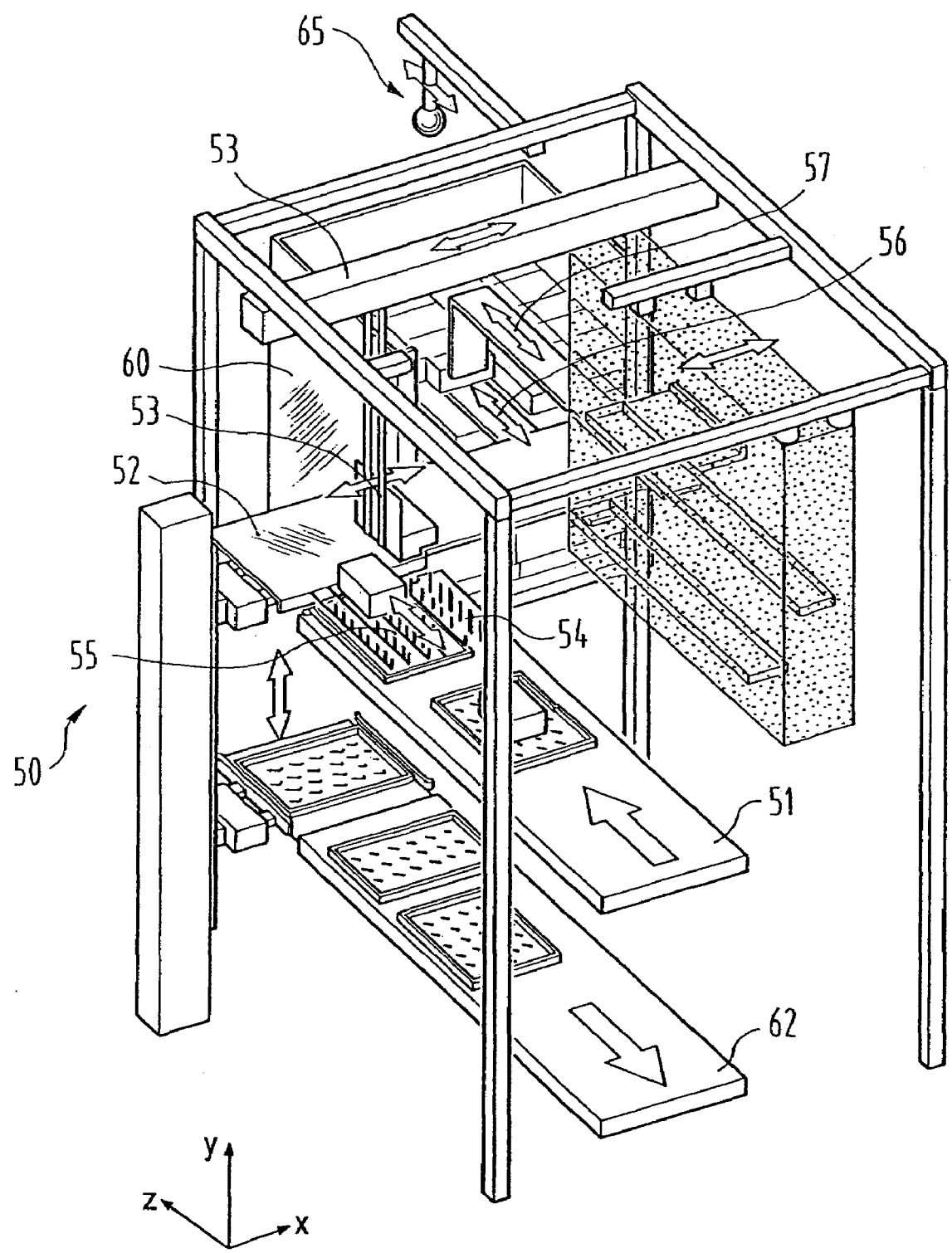
FIG. 10 is a diagrammatic perspective view of an embodiment of a loading apparatus, which is usable in the storage system according to the invention.

FIG. 10 is a perspective view of an embodiment of a load-carrier loading apparatus 50. The mode of operation of this embodiment is further clarified by the sequence diagrams shown in FIGS. 11 and 12.

The trays 10 each carrying a packing unit 15 are fed by a tray conveyor 51 to the loading apparatus 50. At the end of the tray conveyor 51 lifting pins 54 of a lifting device act from below through the openings 11 in the tray upon the packing unit 15 and hence lift the latter out of the tray 10. A rake 55 then acts upon the packing unit 15 and pushes it onto a horizontal loading plate 52. The lifting pins may then be dropped back under the tray conveyor 51 so that the empty tray 10 may be conveyed by a tray-returning conveyor 62 back into the tray storage facility. The packing unit 15 situated on the loading plate 52 is moved by means of a displacement device (pusher) 53 in x-direction, i.e. in the direction of the longitudinal side of the load carrier 20, to the intended x-position of the packing unit in the loading configuration of the load stack 21. The packing unit 15 is then pushed by means of a scraper 57 onto a loading tongue 56, which projects in z-direction (depth direction of the load stack), and moved by means of said loading tongue in z-direction to the intended z-position of the three-dimensional loading configuration of the load stack. Then the loading tongue 56 is retracted, while the scraper 57 initially remains in position, with the result that the packing unit 15 is deposited at its intended position on the load stack. Loading tongue and scraper are then retracted in order to receive the next packing unit. In order to perform the described loading task, loading tongue and scraper have to be movable simultaneously in x-direction and independently of one another in z-direction.

The order load carriers may be e.g. commercially available pallets such as so-called Euro pallets. The invention is however also suitable for use with laterally enclosed load carriers such as e.g. boxes, containers or mesh boxes. For loading such enclosed load carriers by means of the loading apparatus a load-carrier tilting device (not shown in the drawings) is provided, which tilts an enclosed load carrier through e.g. 90 degrees in a forward direction so that it is accessible and may be loaded, as it were, from above. With the aid of the previously mentioned packing-unit tilting device 85 the packing units may be brought into the corresponding tilted position prior to loading.

The loading operation is described once more in detail below with reference to the sequence diagrams in plan view of FIG. 11. In diagram 1, the packing unit 15 situated on the tray 10 is acted upon by the lifting pins 54 and then conveyed by the rake 55 onto the loading plate 52. The packing unit 15 is then displaced by the displacement device 53 in x-direction to the loading position (diagrams 2 and 3). Once the correct x-position has been reached (diagram 4), the packing unit is pushed by the scraper 57 onto the loading tongue 56 (diagram 5) and then, while lying on the loading tongue 56, is pushed in z-direction to the intended position (diagrams 6 and 7) and then pressed by a slight movement of the loading tongue in (in said case) negative x-direction against a packing unit already provided in the load plane (diagram 7). The loading tongue is then retracted, while the scraper 57 initially remains in position (diagram 8), with the result that the packing unit 15 is deposited in its intended position. Finally, loading tongue and scraper are both retracted so that the next packing unit 15a may be positioned.

As is evident from diagram 6, as the first packing unit 15 is being loaded by the loading tongue onto the load stack, the next packing unit is already being pushed by the rake 55 onto the loading plate 52, then in diagrams 7, 8 and 9 displaced by the displacement device 9 in x-direction into the correct position and in diagram 10 acted upon by the scraper 57.

The individual trays and packing units follow one another at a distance that allows each of the individual movements to be non-interacting and to be executed independently of one another.

Figure 12:
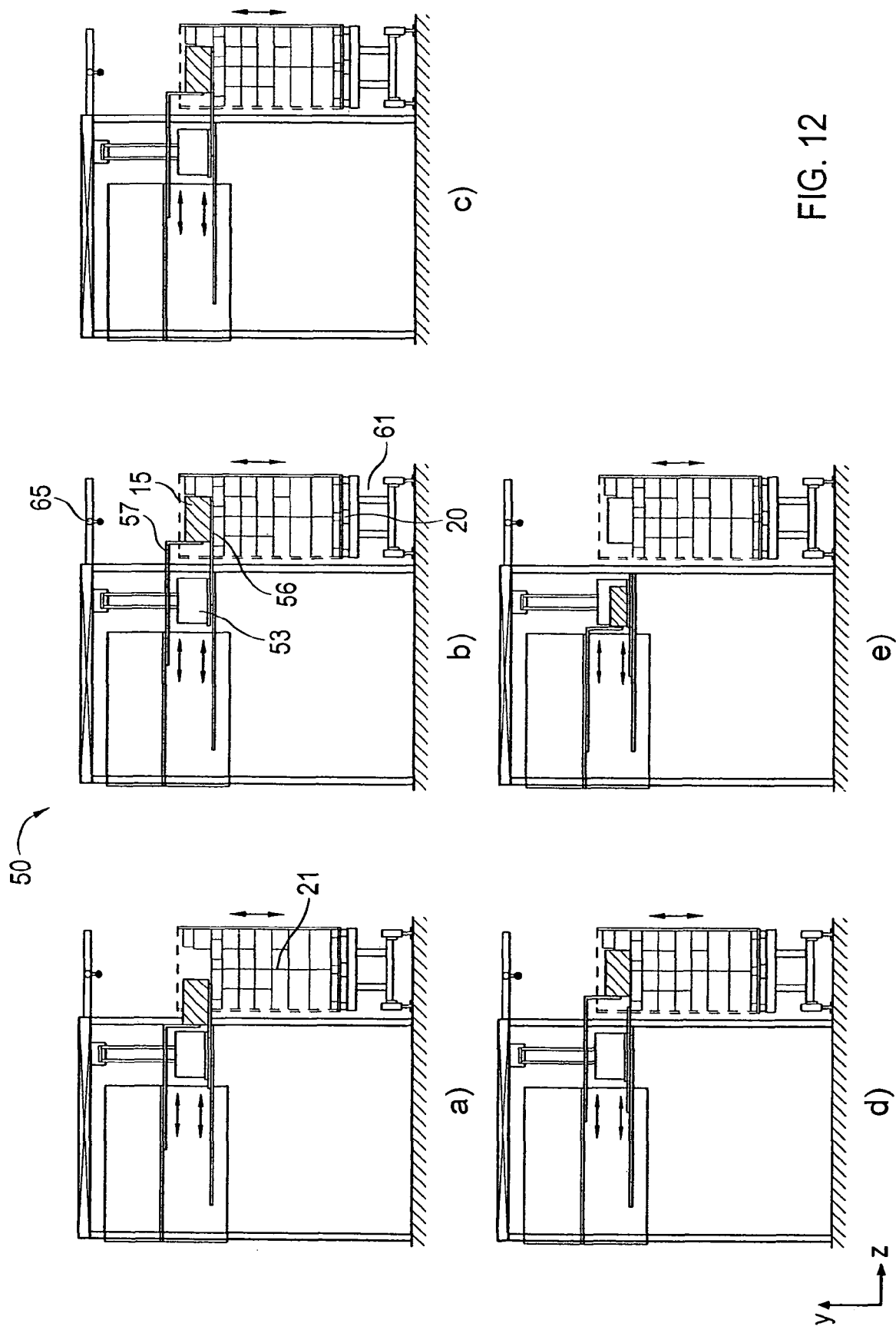
FIG. 12 is a sequence of diagrammatic side views of an embodiment of the loading apparatus of FIG. 10.

The sequence of FIG. 12 shows the mode of operation of the loading apparatus according to the invention in side view. Here, mention should be made of the pallet-lifting device 61, which effects the positioning of a packing unit in the load stack in y-direction by lifting and/or lowering the load carrier. It is also clearly evident from FIG. 12 how in FIGS. 12a), 12b), 12c) the packing unit 15 ("cardboard box") is conveyed by loading tongue 56 and scraper 57 to the correct depth position on the load stack. In the method step shown in FIG. 12d) the loading tongue 56 is already retracted and the packing unit is held in position only by the scraper 57, which in FIG. 12e) likewise retracts in order to be able to act upon the next packing unit.

Also provided in the illustrated embodiment is a scanning device 65, e.g. in the form of a laser scanner for detecting the actual height of the load stack and for checking whether the loading operation corresponds to the calculated stipulations. The scanning device 65 is preferably disposed in a movable manner.

Figure 11:
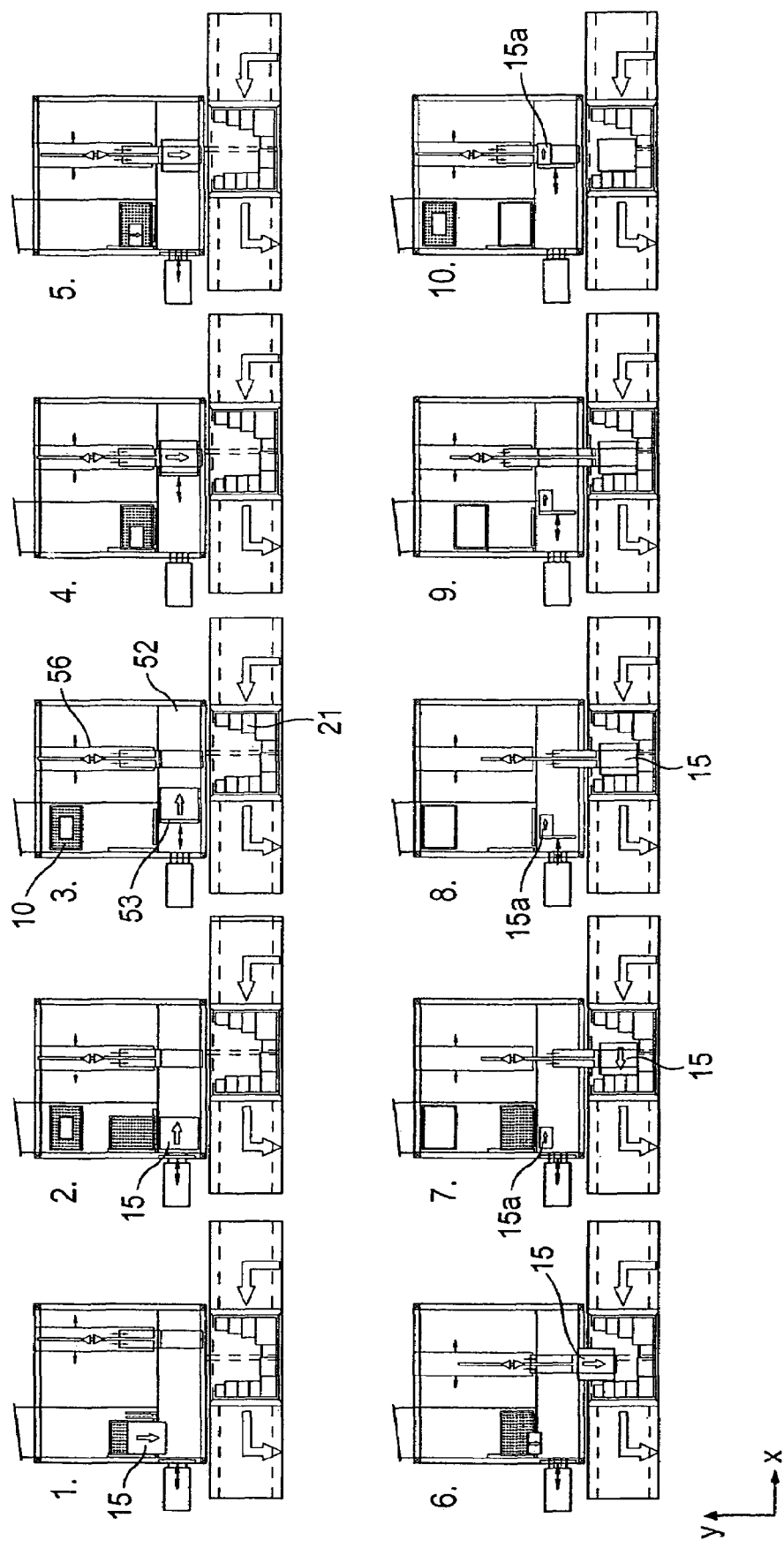
FIG. 11 is a schematic sequence diagram illustrating the loading operation with the apparatus of FIG. 10.

Also evident from FIGS. 10 to 12 is the loading aid or dressing container 60, which encloses the developing load stack 21 on three sides and hence may serve as a support surface for a pushing movement of the packing units in horizontal direction.

Figure 13:
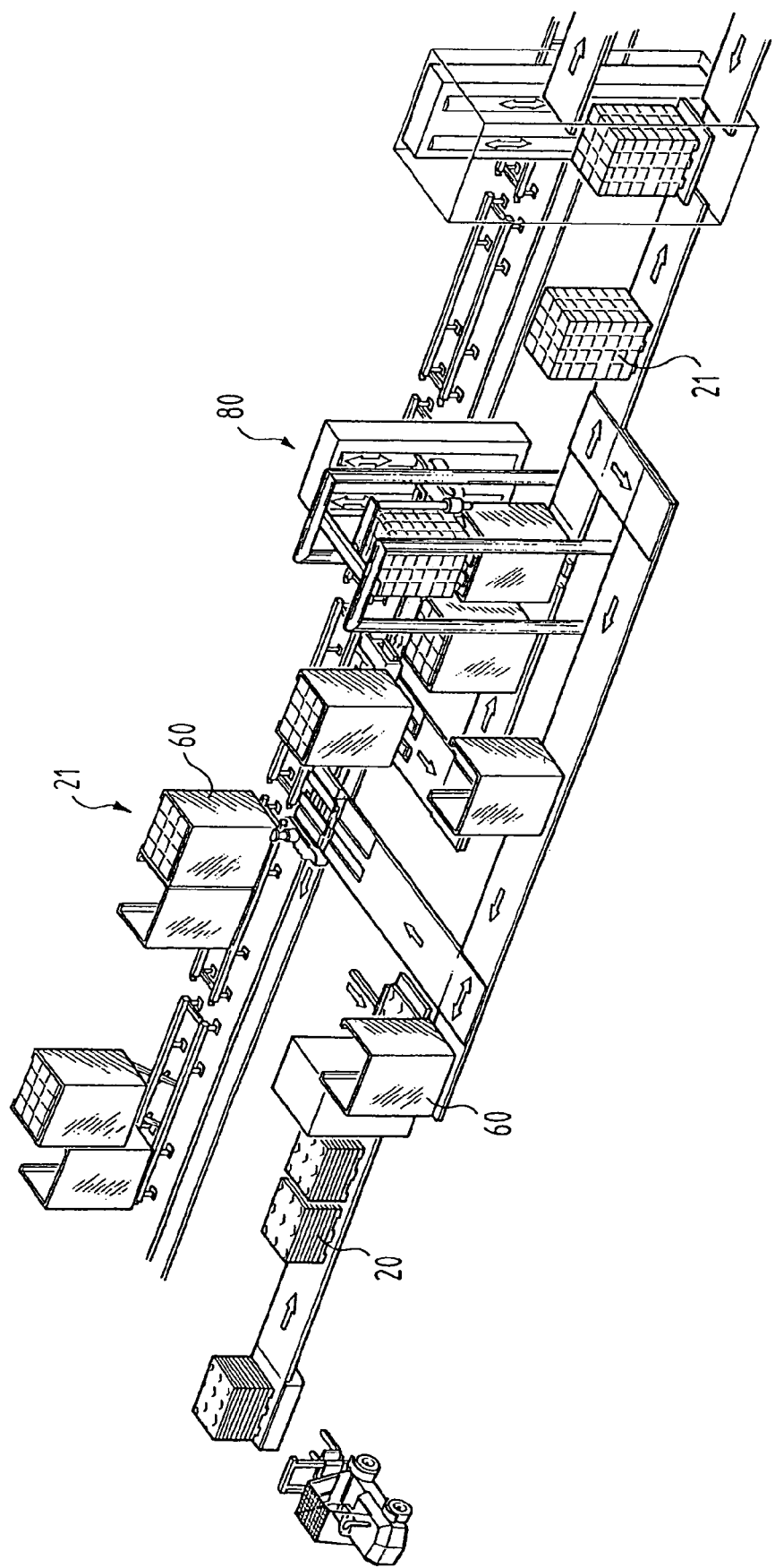
FIG. 13 shows an embodiment of a film wrapping apparatus, which is usable in the storage system according to the invention.

As soon as a load carrier has been fully loaded with a load stack 21, a load-carrier changing device 58 exchanges the full load carrier for a fresh, empty load carrier (FIG. 13). The full load carrier passes, as is likewise shown in FIG. 13, to a film wrapping machine 80, in which the loaded load carrier 20 is lifted out of the loading aid 60 and simultaneously wrapped in a film to stabilize the load stack. The wrapped load stack is then moved by means of a lift or the like to a loading ramp for loading on the lorry, while the empty loading aid is provided with a pallet and then returned to the loading apparatus.

The invention therefore allows practically all of the operations carried out in a storage system, including picking, to be carried out in an automated and mechanized manner so that, by virtue of the invention, a marked increase in the profitability of the storage and picking system may be achieved. In addition, within the scope of the invention it is possible also to automate the operations of unloading the delivered incoming pallets from the supplier lorries and loading the full order pallets into dispatch lorries.

List of reference characters

| | |
|---|---|
| 10 | tray |
| 11 | tray openings |
| 12 | edge |
| 15 | packing unit, cardboard box |
| 20 | load carrier, order pallet |
| 21 | load stack |
| 41 | storage paths |
| 42 | retrieval paths |
| 45 | sorting device/overtaking device |
| 47 | lift |
| 48 | rotary apparatus |
| 50 | pallet-loading machine, COM |
| 51 | tray conveyor |
| 52 | loading plate |
| 53 | displacement device, pusher |
| 54 | lifting pins |
| 55 | rake |
| 56 | loading tongue |
| 57 | scraper |
| 58 | load-carrier changing device |
| 60 | loading aid |
| 61 | pallet-lifting device |
| 62 | tray-returning conveyor |
| 65 | scanning device |
| 70 | tray-vibrating device |
| 71 | tilting support |
| 72 | lifting piston |
| 73 | support plate |
| 80 | film wrapping machine |
| 85 | packing-unit tilting device |
| 100 | pallet storage facility |
| 101 | storage racks |
| 103 | aisles |
| 105 | depalletizing device |
| 110 | delivery |
| 120 | functional area |
| 130 | tray storage facility |
| 131 | storage racks |
| 133 | aisles |
| 135 | rack-mounted storage/retrieval machines for tray storage facility |
| 140 | loading |
| 141 | lorry ramps |
| 200 | lorry |

The invention claimed is:

1. An automated storage system for storing and picking articles, comprising:

a device for separating delivered articles into packing units and transferring the latter onto trays, wherein the trays each have openings, through which lifting pins engage in order to lift a packing unit from the tray, a tray storage facility for storing the packing units on the trays, a retrieval conveying system for removing and feeding the packing units in sequence for loading onto order load carriers, and a loading station for loading the packing units in a defined loading sequence onto the order load carriers.

2. The storage system according to claim 1, wherein in the tray storage facility one packing unit is situated on each tray.

3. The storage system according to claim 1, wherein the tray storage facility has storage modules for collating the packing units into article groups.

4. The storage system according to claim 1, having a pallet storage facility for storing the articles on incoming load carriers.

5. The storage system according to claim 1, wherein the retrieval conveying system has a sorting device for trays.

6. The storage system according to claim 1, wherein the retrieval conveying system comprises computer-controlled rack-mounted take-off machines.

7. The storage system according to claim 1, wherein the tray storage facility is designed for storing trays of a plurality of defined dimensions.

8. The storage system according to claim 1, wherein the loading station has at least one loading machine for automated loading of the order load carriers with the packing units.

9. The storage system according to claim 8, wherein a plurality of retrieval paths of the retrieval conveying system are associated with each loading machine.

10. The storage system according to claim 8, having a rotary apparatus for rotating the trays and packing units situated thereon into a defined position for feeding to the loading machine.

11. The storage system according to claim 1, having a tray-vibrating device for defined positioning of a packing unit on the tray.

12. The storage system according to claim 1, having a packing-unit tilting device for tilting a packing unit and for depositing the tilted packing unit on the tray.

13. The storage system according to claim 1, having a load-carrier tilting device for tilting load carriers for the purpose of loading laterally enclosed load carriers.

14. A method of picking and storing articles in a storage facility, the method comprising:

separating the stored articles into packing units;

transferring the packing units onto trays;

storing the packing units situated on the trays in a tray storage facility used as a buffer;

removing and feeding, using a retrieval conveying station, the packing units in sequence for loading onto order load carriers, wherein the trays each have openings through which lifting pins engage in order to lift a packing unit from the tray; and loading the packing units at a loading station in a defined loading sequence onto the order load carriers.

15. The method of claim 14, wherein one packing unit is stored on each tray.

16. The method of claim 14 further comprising storing the articles on the incoming load carriers in a pallet storage facility.

17. The method of claim 14, wherein removing and feeding, using a retrieval conveying station, the packing units further comprises sorting device for the trays.

18. The method of claim 14, wherein storing the packing units further comprises storing trays of a plurality of defined dimensions.

19. The method of claim 14, wherein loading the packing units further comprises automatically loading, with at least one loading machine, of the order load carriers with the packing units.

20. The method of claim 19 further comprising rotating, using a rotary apparatus, the trays and packing units situated thereon into a defined position for feeding to the loading machine.

21. The method of claim 14 further comprising using a tray-vibrating device to define a position of a packing unit to the tray.

22. The method of claim 14 further comprising tilting, using a packing-unit tilting device, a packing unit and depositing the tilted packing unit on the tray.

23. The method of claim 14 further comprising tilting, using a load-carrier tilting device, load carriers for the purpose of loading laterally enclosed load carriers.

24. The method of claim 14, wherein storing the packing units further comprises collating, using storage modules, the packing units into article groups.

* * * * *